US012768051B2

(12) United States Patent
Fish et al.

(10) Patent No.: US 12,768,051 B2
(45) Date of Patent: Oct. 20, 2026

(54) METHODS FOR INFILTRATING GALLIUM INTO POROUS SCAFFOLDS

(71) Applicant: U.S. Army DEVCOM, Army Research Laboratory, Adelphi, MD (US)

(72) Inventors: Michael C. Fish, Arlington, VA (US); Rachel C. McAfee, Washington, DC (US); Bruce R. Geil, Cooksville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 11 days.

(21) Appl. No.: 18/439,300

(22) Filed: Feb. 12, 2024

(65) Prior Publication Data

US 2025/0257468 A1 Aug. 14, 2025

(51) Int. Cl.

*C23C 26/00* (2006.01)
*C09K 5/06* (2006.01)

(Continued)

(52) U.S. Cl.

CPC .............. *C23C 26/00* (2013.01); *C09K 5/063* (2013.01); *C23C 18/1637* (2013.01);

(Continued)

(58) Field of Classification Search

CPC . C23C 26/00; C23C 18/1637; C23C 18/1644; C23C 18/1689; C23C 18/1834; C23C 18/42; C09K 5/063

See application file for complete search history.

(56) References Cited

U.S. PATENT DOCUMENTS

2013/0253657 A1* 9/2013 Hotta .................. A61L 27/3616 427/2.24
2018/0201010 A1* 7/2018 Ma ........................... B41M 1/12

FOREIGN PATENT DOCUMENTS

CN 202796464 3/2013
CN 106753252 A * 5/2017 ............... C09K 5/06

(Continued)

OTHER PUBLICATIONS

M. Fish, A. Wilson, B. Hanrahan and C. Pullen, "Gallium Infiltration of Porous Metal Foams," 2021 20th IEEE Intersociety Conference on Thermal and Thermomechanical Phenomena in Electronic Systems (iTherm), 2021, pp. 301-307, https://doi.org/10.1109/ITherm51669.2021.9503153.

(Continued)

*Primary Examiner* — Dah-Wei D. Yuan
*Assistant Examiner* — Nga Leung V Law
(74) *Attorney, Agent, or Firm* — Eric B. Compton

(57) ABSTRACT

We disclose novel methods for infiltrating gallium or an alloy thereof into a porous scaffold. Such methods include selecting or providing a porous scaffold; and using a centrifuge to at least partially fill the porous scaffold with gallium or an alloy thereof. The void fraction of the filled-coated scaffold is preferably no more than about 10%. In some embodiments and implementations, the methods further include forming a coating on the porous scaffold to enhance wetting of the scaffold to gallium before infiltration with the centrifuge. With the coating, the void fraction of the filled-coated scaffold may be advantageously reduced to be no more than about 2%. Cleaning step(s) may be further provided to remove oxides from the scaffolds before infiltration with the centrifuge.

17 Claims, 5 Drawing Sheets

(51) Int. Cl.

| | |
|---|---|
| ***C23C 18/16*** | (2006.01) |
| ***C23C 18/18*** | (2006.01) |
| ***C23C 18/42*** | (2006.01) |

(52) U.S. Cl.

CPC ...... *C23C 18/1644* (2013.01); *C23C 18/1689* (2013.01); *C23C 18/1834* (2013.01); *C23C 18/42* (2013.01)

(56) References Cited

FOREIGN PATENT DOCUMENTS

| | | | | | |
|---|---|---|---|---|---|
| CN | 108251063 | A | * | 7/2018 | ............. C09K 5/063 |
| CN | 113881939 | A | * | 1/2022 | |
| CN | 114032072 | A | * | 2/2022 | ............. C09K 5/063 |
| WO | WO-2020237012 | A1 | * | 11/2020 | .............. B22F 10/28 |

OTHER PUBLICATIONS

R. McAfee, M. Fish and J. Gess, "Zener Diode Reverse Breakdown Voltage as a Simultaneous Heating and Temperature Sensing Element," 2022 21st IEEE Intersociety Conference on Thermal and Thermomechanical Phenomena in Electronic Systems (iTherm), 2022, pp. 1-5, doi: 10.1109/iTherm54085.2022.9899600.

T. Yang, J. G. Kang, P. B. Weisensee, B. Kwon, P. V. Braun, N. Miljkovic and W. P. King, "A composite phase change material thermal buffer based on porous metal foam and low-melting-temperature metal alloy," Applied Physics Letters, vol. 116, No. 7, Feb. 2020.

Y. Yao, Y. Cui and Z. Deng, "Phase change composites of octadecane and gallium with expanded graphite as a carrier," RSC Advances, vol. 12, No. 27, pp. 17217-17227, Jun. 2022.

Livshits, G.I., et al., "Sacrificial gold coating enhances transport of liquid metal in pressurized fountain pen lithography," Sci Rep 11, 4670 (2021). https://doi.org/10.1038/s41598-021-84065-4.

R. McAfee, M. Fish, D. Baker, J. Gess and L. Boteler, "Compatibility Analysis of Liquid Gallium and Common Packaging Metals for Application in Electronic Component Thermal Management," 2020 19th IEEE Intersociety Conference on Thermal and Thermomechanical Phenomena in Electronic Systems (ITherm), Orlando, FL, USA, 2020, pp. 1276-1281, doi: 10.1109/ITherm45881.2020.9190557.

R. C. McAfee, M. C. Fish and H. H. Tsang, "Development of Gallium Infiltrated Metal Foams for Transient Thermal Management," 2023 22nd IEEE Intersociety Conference on Thermal and Thermomechanical Phenomena in Electronic Systems (ITherm), Orlando, FL, USA, 2023, pp. 1-6, doi: 10.1109/ITherm55368.2023.10177597. [May 30, 2023-Jun. 2, 2023].

Rachel C. McAfee, Michael C. Fish, Adam A. Wilson, Harvey H. Tsang, Jonathan A. Boltersdorf, Soonwook Kim, Nenad Miljkovic, and William P. King, "Fabrication and Thermal Properties of a Gallium and Porous Foam Composite Phase Change Material," ACS Applied Engineering Materials Article ASAP (Publication Date: Oct. 27, 2023), https://pubs.acs.org/doi/abs/10.1021/acsaenm.3c00366.

"Nickel Foam for Battery Cathode" webpage, MTI Corporation, available at https://www.mtixtl.com/NickelFoamforBatteryCathodeSubstrate1mlengthx300mmwidthx1.6mm.aspxo (accessed Jul. 27, 2023).

"Metal Foam Material" webpage, ERG Aerospace, available at https://ergaerospace.com/metal-foam-material/ (accessed Aug. 22, 2023).

"Ceramic Foam" webpage, ERG Aerospace, available at https://ergaerospace.com/ceramic-foam/ (accessed Aug. 31, 2023).

"Liquid Alloys" webpage, Indium Corporation. https://www.indium.com/products/alloys/liquid-alloys/ (accessed Nov. 16, 2023).

U.S. Appl. No. 17/893,350 titled "Dielectric Capacitor Formed of a Dielectric-Coated Electrically Conductive Porous Scaffold Filled With Metal" filed Aug. 23, 2022.

U.S. Appl. No. 18/369,934 titled "Thermal Buffering Electrical Interconnects" filed Sep. 19, 2022.

* cited by examiner

Gallium Infiltrated-Nickel Foam
w/o Gold Coating

Gallium Infiltrated-Nickel Foam
w/ Gold Coating

METHODS FOR INFILTRATING GALLIUM INTO POROUS SCAFFOLDS

GOVERNMENT INTEREST

The invention described herein may be manufactured, used and licensed by or for the U.S. Government without the payment of royalties thereon.

BACKGROUND OF THE INVENTION

Field

Embodiments of the present invention are directed to infiltration methods, and more particularly, to method for infiltrating gallium into porous scaffolds.

Description of Related Art

Phase change materials (PCMs) are a topic of interest in electronics cooling due to their ability to store heat via a reversable phase change, keeping device temperatures low. Low melting point metals (LMPMs) are metals that exhibit this phase change near room temperature, which is preferable for some electronics cooling applications.

Research has explored the use of LMPM infiltrated metal foams to contain the LMPM in the liquid phase and enhance certain material properties. There is commercial interest in applying it as an electrical and thermal interconnect due to its self-healing and electrical properties. The composite could be integrated with consumer electronics such as virtual reality headsets for silent thermal management or used as a thermal buffer. Gallium, for instance, has been used in thermal interconnects and wearable electronics.

The focus on liquid-metal phase change material-foam integration is motivated by the PCM composites potential for near-junction thermal storage in transient systems. These foams are useful for any system that undergoes cyclic or intermittent thermal events. This allows the foams to store and release energy, reducing transient temperature spikes. This is relevant to pulsed power, power conversion, and directed energy applications. Matching the appropriate material and density of foam with a known heat load can improve system Size, Weight, and Power (SWaP).

However, gallium has not been successfully infiltrated to provide a low void fraction into high porosity foams due to issues with intermetallic formation and high surface tension.

Improvements are desired.

BRIEF SUMMARY OF THE INVENTION

Embodiments of the present invention are directed to novel infiltration methods for gallium and alloys thereof into porous scaffolds, and their resulting products. For instance, a method for infiltrating gallium or an alloy thereof into a porous scaffold comprises: selecting or providing a porous scaffold; and using a centrifuge to at least partially fill the cleaned coated scaffold with gallium or an alloy thereof. The void fraction of the filled-coated scaffold is preferably no more than about 10%.

The method may or may not require further cleaning the porous scaffold to remove oxides before infiltration with the centrifuge depending on the scaffold material. For instance, the cleaning can include applying a HCl, ultrasonic deionized (DI) water, and/or a multi-chemical rinse (e.g., acetone, methanol, and isopropyl alcohol) rinse to scaffolds that form oxides, such as nickel.

Moreover, in some embodiments and implementations depending on scaffold material, the method can further comprise forming a coating on the porous scaffold to enhance wetting of the scaffold to the liquid metal prior to infiltration with the centrifuge. With the coating, the void fraction of the filled-coated scaffold may be no more than about 2%. For instance, the coating may include gold (Au), copper (Cu), aluminum (Al) or tin (Sn) as a few non-limiting examples. The coating can be applied to the scaffold by an electroless metal plating process for example. The thickness of the coating may be in the range of 30-100 nm. In some instances, the method may include cleaning the coated scaffold to further remove any oxides formed during the coating before infiltration with the centrifuge. Such cleaning may include applying a HCl, ultrasonic deionized (DI) water, and/or a chemical cleaning (e.g., acetone, methanol, and isopropyl alcohol) rinse. The scaffold and gallium or alloy thereof are preferably packed in a reduced oxygen or oxygen free environment before infiltration with the centrifuge. The gallium or its alloy should be in the liquid phase. To induce infiltration the scaffold and the infiltrating phase change material are centrifuged, overcoming the surface tension of the liquid phase change material and allowing infiltration of the scaffold. During the infiltration step, the centrifuge can be operated at about 12500 RPM for about 15 minutes as a non-limiting speed.

The porous scaffold may include any open pore foam, sponge, woolen material, or 3D printed open pore scaffolding, for instance. As non-limiting examples: the unfilled porous scaffold may have a porosity of about 75-97% or more and an average pore size of approximately 0.01-2.5 mm. It may have a surface density of about 350-1500 $g/m^2$. For instance, the scaffold could be metal or alloy, carbon-based material, or ceramic material. If metal or a metal alloy, it could be nickel (Ni), aluminum (Al), platinum (Pt), copper (Cu) or carbon (C) as non-limiting examples.

According to embodiments, a gallium filled porous scaffold forming by the aforementioned methods may include: a porous scaffold; and gallium or an alloy thereof at least partially filling the porous scaffold. The void fraction of the filled scaffold is preferably no more than about 10%. In some embodiments, there can be a coating formed on the porous scaffold to enhance foam wetting of the scaffold to gallium. The void fraction of the filled coated scaffold here is preferably no more than about 2% to ensure appropriate thermal conductivity.

These and other embodiments of the invention are described in more detail, below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments, including less effective but also less expensive embodiments which for some applications may be preferred when funds are limited. These embodiments are intended to be included within the following description and protected by the accompanying claims.

DETAILED DESCRIPTION

Porous scaffolds are filled or infiltrated with gallium or alloys thereof, a low-melting point metal phase change material (PCM), using the novel methods disclosed herein. The novel methods involve a cleaning process, a coating to facilitate wetting, use of a centrifuge to partially or fully infiltrate foams, and an outlined packaging technique to join the composite to a surface. They result in a gallium-metal phase change material composite with favorable thermal and mechanical characteristics for use in thermal management of electronics. We have tested and verified the method of creating low-void gallium-foam composites.

Figure 1:
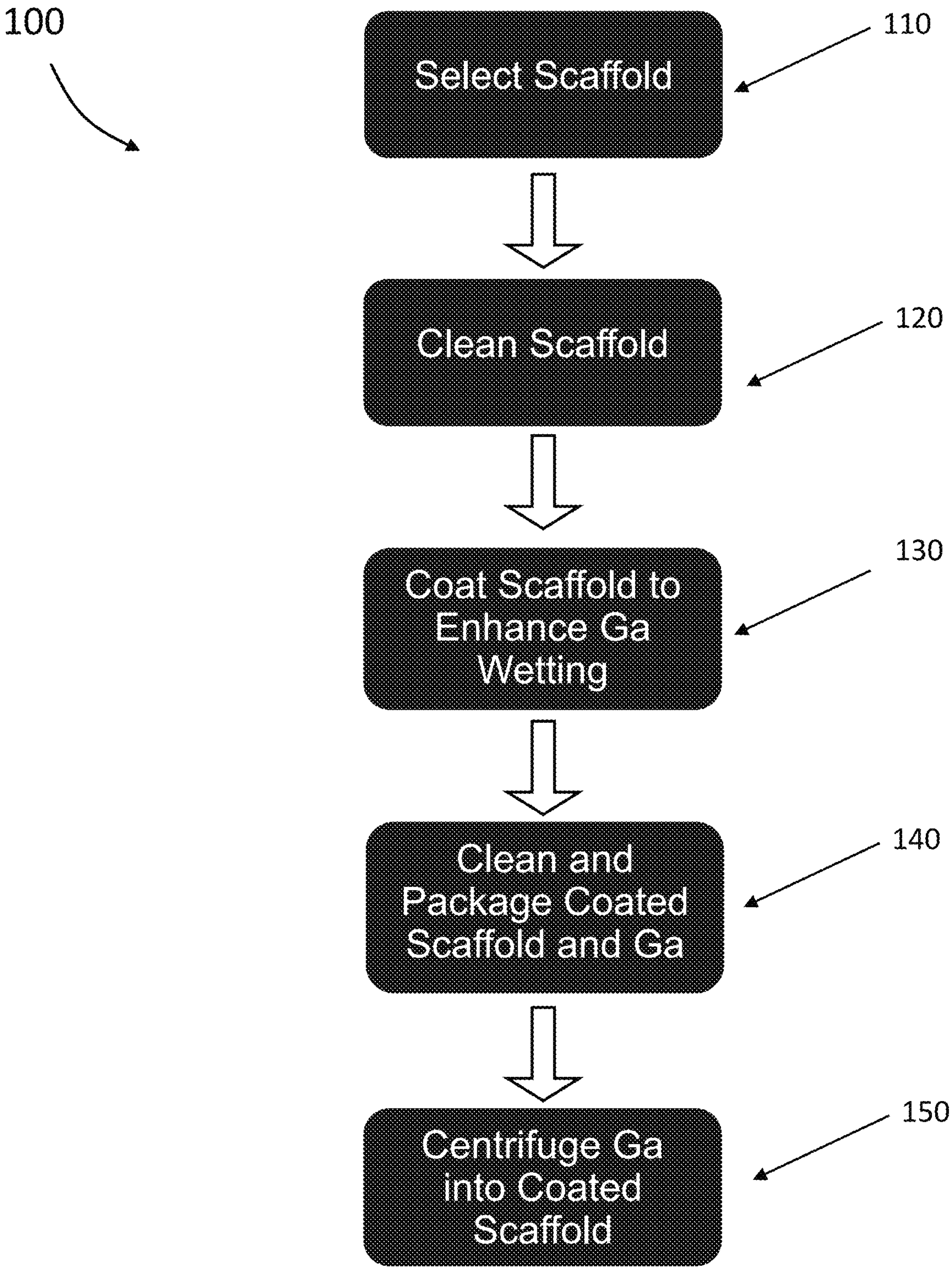
FIG. 1 depicts a method for infiltrating high porosity scaffolds with gallium or alloys thereof according to embodiments of the invention.

FIG. 1 is a flow chart depicting a method 100 for infiltrating high porosity scaffolds with gallium or alloys thereof according to embodiments of the present invention. The methods advantageously can be practicing using commonly available lab equipment. By packaging and cleaning in a low-oxygen (or oxygen-free) environment prior to infiltration and centrifuging the scaffold and gallium together at high speeds, successful infiltration can be achieved even with high porosity, high surface density (high pores per inch—PPI) open-cell scaffold. A coating 2 may be further applied and used to enhance the wetting of gallium to open-cell foams without compromising thermal performance. Our testing indicates successful formation of low void gallium-foam phase change material composites that can mitigate thermal transients. The resultant composites have favorable thermal characteristics and electrical conductivity promoting use as a multi-functional component. The encapsulation of the gallium within the scaffold also reduces movement and improves handling, improving mechanical and reliability factors for this thermal solution. The composite has applications in power conversion, directed energy, and cyclic power loading.

Figure 1A:
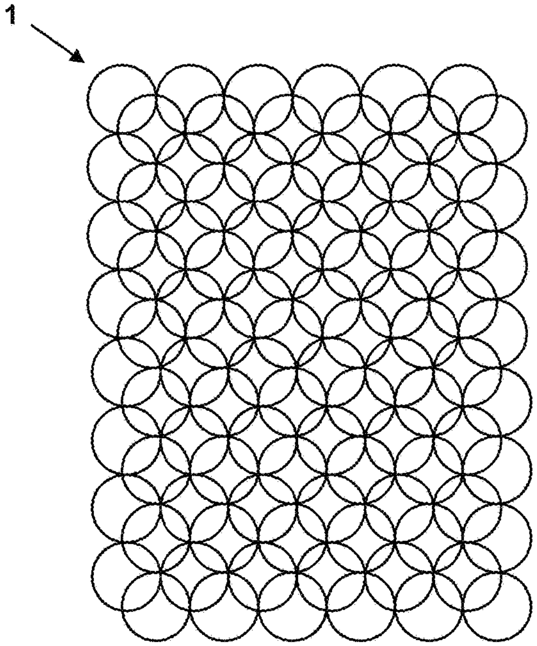
FIG. 1A shows a porous scaffold as sourced.
Figure 1B:
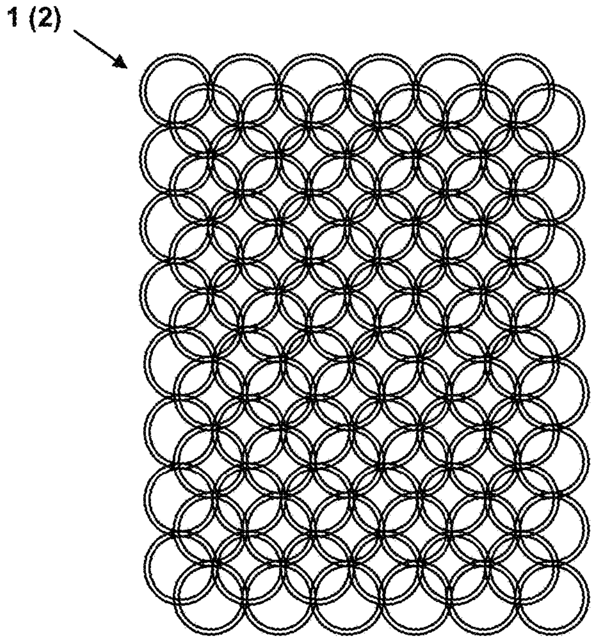
FIG. 1B shows a coating formed on the porous scaffold to enhance the gallium wetting.
Figure 1C:
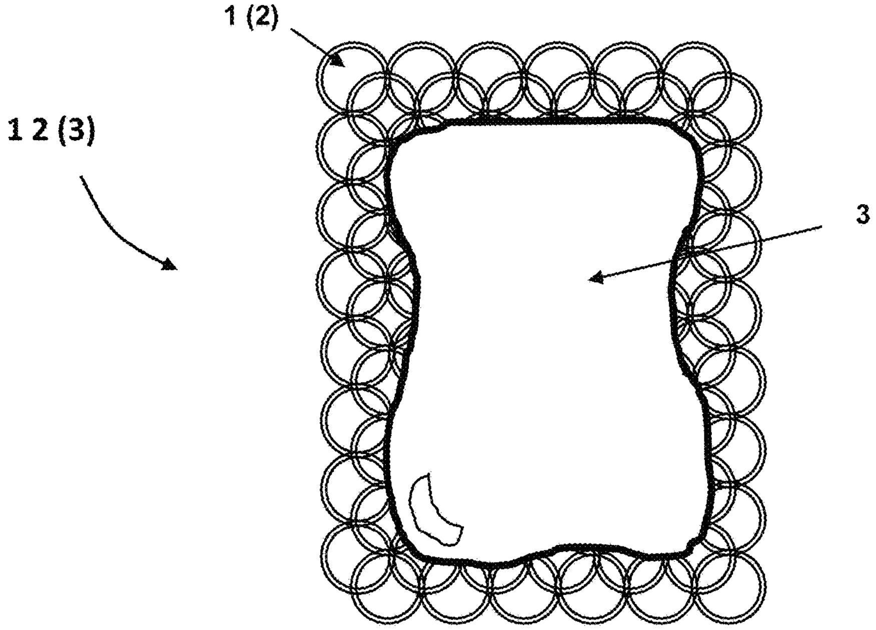
FIG. 1C shows the porous scaffold having a coating filed with gallium or alloy thereof.
Figure 2A:
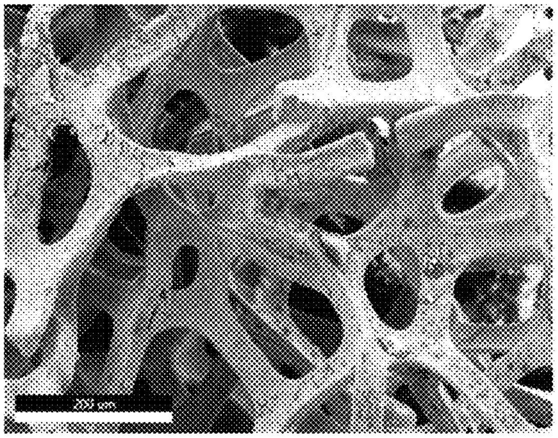
FIG. 2A is a photograph showing a magnified sample of MTI Corporation foam.
Figure 2B:
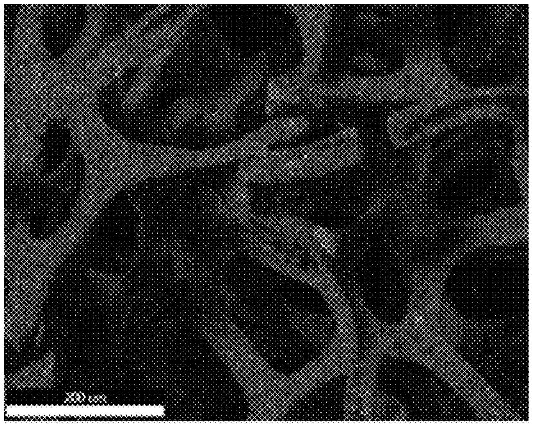
FIG. 2B is a photograph showing the foam after gold plating.
Figure 2C:
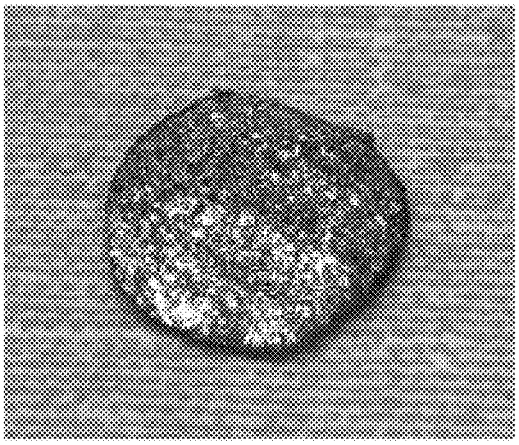
FIG. 2C is a photograph showing a bulk sample of the gold-plated nickel foam after having been infiltrated with gallium metal.

FIGS. 1A-1C is a sequence of images showing the structure as it is being fabricated following the steps of method 100 according to embodiments of the present invention. FIGS. 2A-2C are corresponding photographs showing an exemplary structure as it is fabricated in more detail following steps of the method.

The result of method 100 is a composite 1 (2) (3). The gallium or alloy thereof 3 functions an electrically conductive phase change material (PCM) at least partially filling the porous space of the coated porous scaffold 1 (2). The resultant gallium-filled composite 1 (2) (3) thus formed by the method has high bulk electrical conductivity and has superlative thermal buffering properties while the gallium is undergoing a phase transition (i.e., melting). PCM-filled porous scaffolds of this type are generally known. However, conventional processes for infiltrating gallium, in particular, have been problematic. This is due to the high surface tension of gallium with respect to the small pores of the scaffold 1.

Voiding, the presence of air in the composite, significantly reduces latent heat and inhibits heat flow through the composite. A key aspect of the filling/infiltration method is the reduced formation of voids in the resultant composite 1 (2) (3). We characterize a desirable "low void fraction" in this procedure, i.e., no more than about 10% (by volume). In some embodiments, the void fraction may be no more than 2% (by volume), such as approximately 1-2% (by volume). Importantly, this low void fraction has a negligible impact on the thermal properties of the material, such as effective thermal conductivity or latent heat. Therefore, it can be categorized as a "low void fraction" and is not deemed significant in terms of material performance. Evaluation of this can be conducted through various means, such as MicroCT, latent heat, and thermal conductivity measurements.

This is compared to other known methods that result in higher void fractions, e.g., >10% (by volume). Such high voiding can have adverse effects on thermal performance if the voids are present in-plane, creating a barrier that hinders thermal conductivity. Additionally, the composite 1 (2) (3) is electrically conductive in the "bulk" sense. Put simply, at least one of the scaffold 1, the plating 2, and the gallium or alloy thereof 3 should be electrically conductive, and in some cases, all three may be. The term "electrically conductive" as used herein means such electrical conductivity $\sigma$ of at least 0.01 S/cm. Preferably, it will be more than 0.1 S/m and more preferably 1-1000 S/cm or even more (e.g., $10^4$-$10^7$ S/cm or more). To determine the bulk electrical conductivity of the composite 1 2 (3), a four-point measurement could be used, for instance; then, the resistance of the interconnect is L/GA where L and A are the length and cross section of the interconnect, respectively.

In step 110 in FIG. 1, the scaffold 1 is first selected or otherwise formed or provided (i.e., sourced). The initial scaffold 1 is further depicted in FIG. 1A. The scaffold 1 may be any material that has a porous structure which is compatible with gallium. Previous work was done to verify material compatibility with gallium with results indicating that both platinum (Pt) and nickel (Ni) are well-suited for gallium composite integration, while others are certainly possible. In some embodiments, scaffold 1 itself is electrically conductive. To this end, the scaffold 1 may be formed of various metals with high electrical conductivity, such as nickel (Ni), aluminum (Al), copper (Cu), tin (Sn), and/or alloys thereof, as just a few non-limiting examples. Alternatively, the scaffold 1 may be formed of non-metal like conductive carbon (e.g., graphene) and conductive polymer matrix (e.g., polymers with electrically conductive particles like metals/alloys or conductive carbon incorporated therein). Ceramic materials may also be used, such as silicon carbide (SiC).

The scaffold 1 should have "open porosity," which as used herein means that the pores are open to the ambient and can be infused with a liquid (as opposed to closed cells which are inaccessible to the environment). This permits the scaffold 1 to be filled with gallium or alloy thereof 3 as later discussed. The open porosity may be provided by various materials providing high surface area. This can include various commercially available foam and sponge materials. Porous foam and sponge substrates have a high surface area intrinsically. Also, the scaffold 1 may be a woolen material (e.g., steel wool) which provides a similar open pore structure. It can also include additive manufactured (e.g., 3D printed) open pore scaffoldings. The open pores may be homogenously arranged or randomly spaced. The key parameter is that the pores provide an increased surface area to the scaffold 1 compared to a "flat" surface. Infiltration into arbitrary envelopes could allow gallium deployment in configurations not currently possible in the state of the art. Many commercially available foams and sponges have open-cell scaffoldings. They can be fabricated through various means such as blowing air into the molten material as it is solidifying as one example. A sponge is considered a subset of foams that specifically have open porosity. For purposes of this disclosure, the terms "foam" and "sponge" may be used interchangeably.

Surface area has a complicated relationship with porosity. There are multiple measures of high surface area substrates such as surface density (e.g., mass/area or weight/area), porosity (e.g., % of fully dense volume/weight), and surface area density, which is the area contained within a specific volume (e.g., area/volume). For many commercially available open-pore foams and sponges, the degree of porosity may be given in terms of a percentage with a pore size. A higher percentage means greater number of pores compared to the overall size and thus greater surface area. In non-limiting embodiments, the scaffold 1 may range from about 75 to 97%. The average pore diameter can be approximately 0.01-2.5 mm. However, understand there are limits. If, for instance, the porous volume percentage is exceptional high (e.g., approaching 100%), there may be little material left for the scaffold 1 making it mechanically unsound; it could easily crack and break. Pore size or diameter values usually by themselves is not indicative of surface area of the scaffold. Yet, surface area typically increases compared to the overall volume as the pore size decreases (similar to very small particles where the surface area increases compared to volume as the diameter decreases). Small pore sizes increase the surface area for nucleation and provide stronger capillary action, reducing gallium movement once infiltrated. While this provides an obstacle to successful infiltration, it benefits reliability and ease-of-packaging at the device junction. The successful infiltration of these small pores pushes the boundary of this method and supports the mechanical advantages of the invention.

Another relevant term is surface density, although, it is not necessarily specific to porous materials. It reports the ratio of the mass (or weight) to the surface area of the scaffolding material. The reciprocal ratio of surface area to mass (or weight) may also be provided in some instances giving the same information. Knowing the mass (or weight) for a given sample, effectively lets one know the surface area. These ratios may be a better criterion for characterizing and selecting a porous surface area for the scaffold 1. The unfilled porous scaffold 2 may have a surface density of about 350-1500 g/m$^2$ or more, as a non-limiting example.

Exemplary porous aluminum, zinc, copper and stainless steel open pore foams/sponges are commercially-available, such as the nickel foams from MTI Corporation, at https://www.mtixtl.com/NickelFoamforBatteryCathodeSubstrate1mlengthx300mmwidthx1.6 mm.aspxo, Duocel® foams from ERG Aerospace, at_https://ergaerospace.com/metal-foam-material/, or ceramic foams from ERG Aerospace, at_https://ergaerospace.com/ceramic-foam/, which may be used for scaffold 1 in non-limiting embodiments.

The scaffold 1 is supplied as or formed and cut to size. It may be laser cut, for instance. As a non-limiting example, the as-sourced scaffold in a sheet having a thickness of 1.6 mm may be cut into cut into 8 mm by 20 mm strips for infiltration.

FIG. 2A is a photograph showing a magnified sample of MTI Corporation foam having ~250 μm diameter pores defined by triangular cross section ligaments in an unfilled state (scale 200 μm). The porosity of the foam is clearly visible.

In step 120 in FIG. 1, we clean the porous scaffold 1. For instance, cleaning may include solvent cleaning including ultrasonic baths of acetone, methanol, and isopropanol, and additionally or alternatively, an oxygen plasma cleaning which prepares the surface for coating 2 growth. Typically, many as-sourced scaffolds have been subject to at least some initial cleaning by the manufacturer. Even so, we have discovered that the as sourced scaffolds still have significant surface oxides which are problematic. The presence of oxides, such as nickel or gallium oxides, reduce gallium wetting and impedes infiltration. Our cleaning in step 120 removes these oxides. For instance, we have found that using a HCl wash results in improvements in terms of gallium wetting. As an example, we clean the scaffolds 1 with a 3M HCl solution for about 10-12 minutes, which reduces oxides without etching the foam in low concentrations. HCl may be used in different concentrations depending on overall process cleanliness and other factors. Other cleaners may be also used, such mild acid solutions. An example would be a weak (e.g., ~5%) sulfuric acid solution, ammonia, or acetic acid. However, cleaning step 120 could be skipped in some embodiments and implementations, should the porous scaffold 1 be sufficiently clean as-sourced.

Moreover, we found that further rinsing with deionized water (DI) and drying removes and/or reduces chloride ions on the surface. Scaffolds can be placed in an ultrasonic cleaner with DI water for about 5-8 minutes before being cleaned with acetone, methanol, and isopropyl alcohol and dried with a nitrogen gun.

Next, in step 130 in FIG. 1, and further depicted in FIG. 1B and shown in depicted in FIG. 2B, a coating 2 may be formed on the porous scaffold 1. This step does necessarily have to be used in all embodiments. Method 100 applies to a wide range of the porous scaffold 1, with or without coating 2. The coating 2 if provided, advantageously enhances wetting for gallium or alloys thereof. The material of coating 2 is assumed to interdiffuse into the gallium 3 after infiltration (step 150). Thus, we refer to it as "sacrificial." Its effect on the overall thermal properties of the resultant gallium-filled composite 1 (2) (3) should be minimal. For instance, 7.5% by volume would result in ~1 J/g decrease in latent heat. So, we keep the coating 2 "thin," i.e., the exemplary thickness of coating 2 is in the range of 30-100 nm, typical of electroless plating. Coating 2 could by a conformal coating since the thin film coating closely conforms to the contours of the open pores of the various surface(s) of the scaffold 1.

Presumably, any material that easily alloys with gallium is envisioned, such as gold (Au), copper (Cu), aluminum (Al), and tin (Sn) as just a few non-limiting examples. Gold has the benefit of not oxidizing; it is also the standard material for an ENIG (electroless nickel, immersion gold) finish that is used for circuit boards and module substrates.

The coating 2 may be achieved by electroless plating, for instance, according to the process discuss in the following reference: G. I. Livshits, et al., "Sacrificial gold coating enhances transport of liquid metal in pressurized fountain pen lithography," *Sci Rep* 11, 4670 (2021), available at https://doi.org/10.1038/s41598-021-84065-4, herein incorporated by reference in its entirety. This is a common procedure for electroless gold plating. For example, we successfully submerged foam in a a gold solution heated to 100° C., covered, and rod stirred to 300 RPM. The foam was removed from the gold solution after 10-15 minutes (10 minutes for standard gold, 15 for blackened). We note that reuse of plating solution resulted in inconsistent material properties. The plating solution should not be depleted in plating metal(s), such as gold or nickel, from previous platings.

Of course, other techniques, such as chemical vapor deposition, reactive thermal treatments, or liquid-phase processing could also be used to apply the conformal coating 2.

FIG. 2B is a photograph showing the foam after a HCl rinse made after gold plating.

In step 140 in FIG. 1, we clean the coated scaffold 1 (2) and package before gallium infiltration (step 150). Successful fabrication is highly reliant on cleaning, oxide reduction, packaging in an inert environment, and the later use of a centrifuge.

The additional cleaning here could potentially be skipped, for instance, if the coated scaffold 1 (2) is sufficiently oxide-free as formed in step 130. We, though, have discovered that oxides may still be present of metal-plated scaffolds/foams due to the extremely thin layer of metal gold with some nickel some being exposed to the atmosphere. Thus, we have found that a second (additional) cleaning (second HCl rinse) after coating step 130, along with careful rinses to remove remaining chloride resulted in the best samples. For instance, we submerge coated scaffolds in a HCl solution for 10-12 minutes and use nitrogen gas to dry off samples and immediately place in glove box vacuum chamber.

Packaging herein generally refers to the design and production in a suitable environmentally-controlled enclosure or sealed chamber ("glove box"). In this case, we are "packaging" liquid gallium, the clean scaffold (e.g., foam), and inert gas into a standard centrifuge tube. This tube is sealed for later use in the centrifuge. The packaging substeps here may be prepared for samples by loading gallium, syringes, cups, etc. and clean open centrifuge tube into the sealed chamber airlock. The airlock is evacuated (e.g., less than 25 torr) and then flooded with an inert gas, repeated at least twice to ensure a fully inert environment inside the chamber and open centrifuge tube. Nitrogen and argon gases are the industry standard inert gases. Any inert gas could potentially be used. Oxygen is the primary concern which we seek to avoid. Once in the main chamber, the gallium may need to be heated in the chamber to maintain a liquid state. (A hot plate may be present in the chamber for this purpose).

We use a syringe to pull liquified gallium from the center (of its container) to avoid any preexisting surface film/oxide before adding to the centrifuge tubes. The scaffold (e.g., foam) is placed in the tubes to be standing upright such that one end is sticking out of the liquid gallium. We then seal the centrifuge tube(s), and they are removed from the chamber and will be brought to the centrifuge.

Next, in step 150 in FIG. 1, the scaffold 1 which is scaffold coated with plating material 2 is at least partially filled with gallium or alloy thereof 3 which needs to be liquid for filling purposes. This may require melting it if the plating material 2 has a melting point above room temperature.

Our research has led us to conclude that a pressure gradient is needed to force or push the liquid gallium uniformly through and into the porous structure of the scaffold. We have found that it is quite difficult to get the metal or alloy 3 to go the inside the coated porous scaffold 1 (2) and to provide low voids using conventional filling methods. This is due to the high surface tension of liquid gallium ($\gamma$=715 mJ/m$^2$). In ambient air, gallium droplets on the foam will ball up and instantly develop an oxide skin.

Our attempts with known methods proved problematic. For instance, we were unsuccessful in attempting infiltration of liquid gallium metal into a porous nickel foam following the procedures outlined by Yang et. al., "A Composite Phase Change Material Thermal Buffer Based on Porous Metal Foam and Low-Melting-Temperature Metal Alloy," *Applied Physics Letters* 2020, 116 (7), DOI: 10.1063/1.5135568, herein incorporated by reference in its entirety. That paper discussed filling copper foams with Field's metal, a bismuth-indium-tin alloy. Infiltration was achieved in a tube furnace, flowing forming gas at 320° C. over the PCM ingot sitting on the metal foam until infiltration was achieved. We also attempted other methods as discussed in: M. Fish, A. Wilson, B. Hanrahan and C. Pullen, "Gallium Infiltration of Porous Metal Foams," 20th IEEE Intersociety Conference on Thermal and Thermomechanical Phenomena in Electronic Systems (iTherm), 2021, pp. 301-307, https://doi.org/10.1109/ITherm51669.2021.950315, herein incorporated by reference in its entirety. Those methods including electrowetting and mechanical injection techniques, as well as pre-treatments like cleaning and annealing. While those methods did specifically use gallium, we were unsuccessful in achieving a low void gallium filled foam. More, the literature lacks a practical method for void-free infiltration of porous metal foams with gallium.

Thus, to overcome the high surface tension of gallium, according to embodiments herein, we use a centrifuge to create a high-pressure gradient. (See FIG. 5).

To maintain the gallium or alloy thereof 3 as a liquid, we preheat centrifuge tubes containing oxide-free gallium and the respective scaffolds before placing them in the centrifuge. For instance, the centrifuge tubes may be heated to ~60° C. in a water filled beaker on a hotplate. Once in the tubes are placed in the centrifuge, the centrifuge is operated at a sufficient speed and for a sufficient time to force the gallium or alloy thereof 3 into the coated scaffold 1 (2). As a non-limiting example, we successfully centrifuged samples at 26,700 RCF (12500 RPM for the machine) for 15 minutes. The resultant gallium-filled composite 1 (2) (3) is removed from the centrifuge tubes. It can be integrated with semiconductors in the glove box to maintain the oxide-free foam surface. Surfaces can be cleaned with a HCl solution and a thin layer of gallium can be used to join the foams to a surface with minimal voiding. FIG. 1C shows the porous scaffold 1 having a coating 2 with gallium or alloy thereof 3. And FIG. 2C is a photograph showing a bulk sample of the gold-plated nickel foam after having been infiltrated with gallium metal.

Gallium and alloys thereof 3 are low melting point metals around 30° C. which are of interest for use as PCMs due to their high thermal and electrical conductivity and desirable transition temperature. They are also electrically conductive, loaning themselves to use in flexible electronics or as conduction paths in electronic system. This unique trait opens the door to co-design, the principle of combining thermal, electrical, and mechanical components to reduce overall size and weight specifications for a given application system.

Table I below shows details of some of the thermophysical properties of bulk gallium which are pertinent to its use as a phase change material for various applications.

TABLE I

Thermophysical properties of gallium.

| Property | Value |
| --- | --- |
| Transition Temperature (° C.) | 30.76 ± 0.38 |
| Latent Heat (J/g) | 78.28 ± 0.39 |
| Specific Heat (l) (J/g-K) | 0.37 |
| Density (p) (g/cm$^3$) | 6.059 |
| Thermal Cond. (l) (W/m-K) | 29.4 |
| Thermal Cond. (s) (W/m-K) | 33.7 |
| Figure of Merit (l)(kJ/m$^2$-K$^{1/2}$-s$^{1/2}$) | 118 |

By alloying gallium with other element(s), these properties can be altered. This allows for judicious PCM tailoring to specific applications. Some non-limiting examples of gallium alloys which may be used include: Ga/In (e.g., 5-25 at. % In; balance Ga; such as Indalloy® #s 77 and 60E), Ga/In/Sn (e.g., 10-20 at. % Sn; 15-25 at. % In; balance Ga; such as Indalloy® #s 51 and 51E;); and Ga/In/Sn/Zn (e.g., 0-1 at %. Zn; 10-20 at. % Sn; 15-25 at. % In; balance Ga; such as Indalloy® #46L).

Thermal energy storage figures of merit are a common way of quantitatively comparing candidate phase change materials, like gallium. Various formulations invariably involve products of density, gravimetric latent heat of phase change, and thermal conductivity. A particularly compelling formulation is given by Shamberger, et al. as it allows direct comparison of latent heat energy storage with single-phase sensible heat energy storage. Here, we use a simplified, temperature-blind version that uses high-temperature (i.e., liquid) phase properties:

$$\eta = \sqrt{k_l(\rho_l L)} \quad (1)$$

Conductivity k, density ρ, latent heat L, transition temperature, and compatibility all play a key role in material selections in Equation 1. Materials with higher figure of merit can accommodate higher heat fluxes for the same driving temperature differential than those with lower η. This leads to greater responsiveness to thermal loads, and thus makes η an excellent proxy for thermal energy storage (TES) power density.

We consider the example of porous nickel foam as the scaffold 1 and gallium 3. (We note the coating 2 is a very small component of the composite 1 (2) (3) in terms of mass and thus can be omitted in the simple calculation; but it could be accounted for in a similar manner for more accuracy). The thermal conductivities k for nickel (Ni) is about 90 W/mK at 30° C. and for gallium (Ga) is 29.3 W/mK at 30° C. The rule of mixtures analysis, according to Equation 2, can be used to estimate its effective thermal conductivity in both the liquid and solid phases for the gallium as follows:

$$k_{eff} = \phi_{Ga} k_{Ga} + \phi_{Ni} k_{Ni} \quad (2)$$

A biphasic differential medium approach or effective medium approach, Equations 3 and 4, can also be used to approximate the ideal gallium foam composite as follows:

$$\frac{k_{eff} - k_{Ga}}{k_{Ni} - k_{Ga}} \left( \frac{k_{Ni}}{k_{eff}} \right)^{1/3} = \phi_{Ni} \quad (3)$$

-continued $$\phi_{Ni} \frac{k_{Ni} - k_{eff}}{k_{Ni} + 2k_{eff}} + \phi_{Ga} \frac{k_{Ga} - k_{eff}}{k_{Ga} + 2k_{eff}} = 0 \quad (4)$$

We note, though, that these equations are somewhat limited in that they do not take surface effects into account. Surface effects such as interfacial resistances between the scaffold and the PCM would reduce effective the bulk conductivity, but the extent to which they exist in and at what length scales they become non-negligible is and active area of research.

Table II below details thermophysical properties for an ideal void-free composite and the expected results for a gold coated, nickel foam filled with gallium as outlined above.

TABLE II

Thermophysical properties for composite

| | ρ (g/cm3) | $c_p$ (J/gK) | L (J/g) | $k_{liquid}$ (J/gK) | $k_{solid}$ (J/gK) |
| --- | --- | --- | --- | --- | --- |
| Theoretical Ideal Gallium-Foam Composite | 6.059 | 0.375 | 72.52 | 31.6-32.4 | 35.8-36.6 |
| Measured Gold-Plated Gallium Foam Composite | 5.91 | 0.371 | 72.44 ± 0.36 | 39.7-50.2* | 42.3-52.5* |

*"Fast transient" effective conductivity

We noted that similar equations can be used for other material selections for the composite 1 2 (3).

EXAMPLES

We fabricated various gallium-foam composite samples and analyzed them to validate both the fabrication method and reportable thermal properties. The materials are all commercially available and easily accessible. Nickel Foam was sourced from MTI Corporation. The manufacturer reports a purity of >99.99 wt % with impurities C≤200, S≤80, Fe≤100, Cu≤100, and Si≤50 ppm. These foams were sourced from MTI Corporation, and have a porosity of greater than 95%, with an areal density of 346 g/m$^2$. Bulk gallium was sourced from MCE Supply Co. via online vendor Gallant Metals. The manufacturer reports a purity of greater than 99.99% gallium.

Pieces of 1.6 mm thick nickel foam were cut to approximately 8 mm by 20 mm, weighing ~110 mg. Foam comes pre-cleaned with 37% HCl in an ultrasonic bath and rinsed with deionized water and ethanol. We further removed residual Ni oxides from the foams by submerging in Hydrochloric Acid (FW 36.46) for 10 minutes. Cleanliness was verified using scanning electron microscopy and energy dispersive x-ray spectroscopy.

We considered samples with and without coatings 2: uncoated nickel and the gold-plated nickel foams infiltrated with gallium. Both are capable of full infiltration of gallium. For the gold plating, we utilized ~3.7 g/mL gold solution (Alfa Aesar) that was heated to 100° C. Foam samples were submerged, and a magnetic stir rod was used to ensure solution homogeneity during the 15-minute plating time, when the entire surface had visible deposition. The gold-plated foam sample underwent another HCl cleaning and three-chemical rinse to ensure an oxide-free surface.

The strips of cleaned and oxide-free foams were immediately transferred to an argon-flooded glovebox via the vacuum airlock. The use an inert atmosphere lowers oxygen and moisture content during gallium and foam integration, reducing oxidation formation.

A pipette was used to pull liquid-phase 99.99% gallium from below the oxide layer on the gallium surface, bringing only the unoxidized gallium into the pipette. This gallium was added to 30 mL (28.5 mm diameter) centrifuge tubes, adding approximately 40 g of gallium or up to a 12 mm depth. This submerges most of the foam. The cleaned foam strip is added to the centrifuge tube and slightly agitated to facilitate initial wetting, and sealed. Foams were slightly agitated in the tube to facilitate initial wetting with the liquid gallium before being sealed and removed from the glove-box. The inert atmosphere prevents formation of gallium oxides that can prevent wetting of the nickel foam.

Samples are heated to 30° C. and loaded into a high-speed, fixed-angle centrifuge. Samples are spun at 26,700 g-force (12,500 RPM for this machine) for 15 minutes at 40° C. The centripetal force of the centrifuge forces the gas from the foam and infiltrates the gallium. Samples can be removed from the centrifuge tube and integrated with semi-conductors in the glove box to maintain the oxide-free foam surface.

Figure 3A:
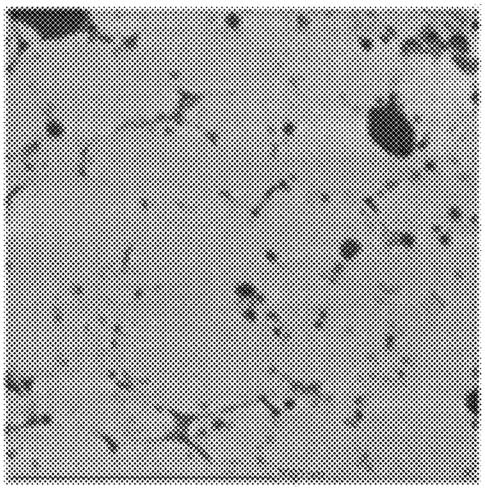
FIGS. 3A and 3B are Micro-CT images of uncoated nickel and gold-plated nickel foams, respectively.
Figure 3B:
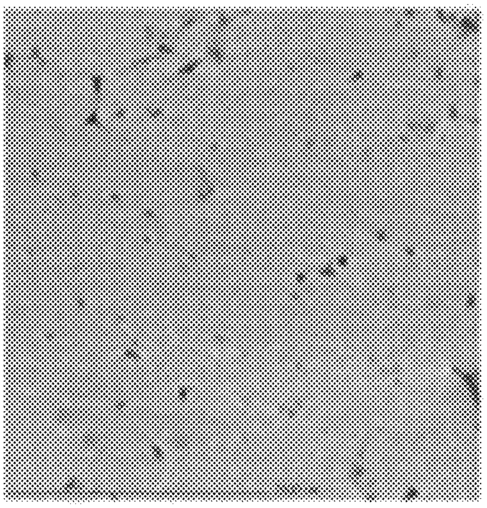

The presence of the coating 2 is significant. The Micro-CT images of the uncoated nickel and the gold-plated nickel foam are shown in FIGS. 3A and 3B, respectively. Most voids appeared along the edges of individual foam pores, indicating poor wetting to the foam surface due to material nature or oxidation in the area. Noticable improvement was seen with the use of a gold coating showing a lower void fraction and smaller individual voids. Final composite samples were observed to have a latent heat of 72.5 J/g and cross sections have no visible major voids.

To further verify and quantify successful infiltration of the foams and report final thermal properties of the newly fabricated material, several approaches and analysis may be used. As non-limiting examples, we considered two methods: Micro-computed tomography (Micro-CT) and Differential Scanning Calorimetry (DCS). Micro-CT is a well-known imaging technique which uses X-rays to see inside an object, on a slice by slice based. For our analysis, we used a Zeiss Xradia Versa 510 Xray Microscope to image each of the prepared samples to verify infiltration and assess void fraction. Each sample was imaged along the X, Y, and Z axis. Foams were cut with shears, resulting in slightly uneven and compressed edges. To account for this, a representative volume was selected from each foams submerged end. The volume measures approximately 7.6 mm by 8 mm neglects 0.2 mm from the sides and end of the foam.

Samples were imaged with a voltage of 160 kV and energy of 10 W. Images are correlated to physical size through the tool's reported scale and the known distance between each image. An Otsu binarizing method was used to assign each pixel a value of "void" or "non-void" in each frame of a depth profiling render. A representative volume was selected from each of the infiltrated foams, neglecting 0.2 mm from the edges of the foam due to compression during sample preparation. The void fraction is then computed as the proportion of void pixels out of the pixels encompassing the study volume.

Differential scanning Calorimetry (DSC) is another well-known technique used to measure heat changes in materials as they are heated or cooled. DSC is also capable of revealing the degree of supercooling mitigation offered by the increased foam surface area. We used a PerkinElmer DSC 8000 to determine the specific and latent heat of finished samples to validate successful infiltration and compare various preparation methods. A program ramp rate of 20° C./min was used, cycling material samples from −20 to 100° C. with a 2-minute dwell time at the maximum and minimum temperatures. The ramp cycle was repeated 5 times and the results were averaged. The bulk gallium used to infiltrate the foam samples was analyzed in the DSC to determine base material properties.

The results void fraction analysis using both Micro-CT and DSC methods are reported in Table III. As these results shows, the gold coating clearly demonstrates an improvement in reducing the void fraction of the infiltration gallium foam. We note that this is not just on the surface, but throughout the composite material.

TABLE III

Summary of Developed Composite Properties and Voiding

| | Measured Foam Composite (w/o Gold Plating) | Measured Foam Composite (w/ Gold Plating) |
|---|---|---|
| Void Fraction By MicroCT Image (% by volume) | 4.97% | 1.75% |
| Void Fraction By Latent Heat (% by volume) | 9.80% | 1.60% |

Moreover, we used a Discover Xenon Flash Method (TA Instruments, DXF 500) to characterize sample thermal diffusivity and conductivity. Samples were prepared via mechanical polishing using 600 grit sandpaper followed by a graphite spray in accordance to tool manufacturer recommendations. Sample thickness was determined with micrometers to a 2.5 μm accuracy. The tool delivers a high-speed xenon flash and the thermal response is measured. The Degiovanni method, the ATSM standard, was used to determine thermal diffusivity which can then be used with the previously found density and specific heat to determine the sample's thermal conductivity.

Specimens were also characterized using a combination of scanning electron microscopy (SEM) and energy dispersive X-ray spectroscopy (EDS). The same samples were examined in both instruments. Samples were mechanically polished prior to scanning. SEM characterization was performed with a Zeiss Auriga Scanning Electron Microscope. Samples were imaged with a voltage of 15 kV. SEM and EDS were used to image the gold-plating and verify cleaning process during methodology development.

Figure 4:
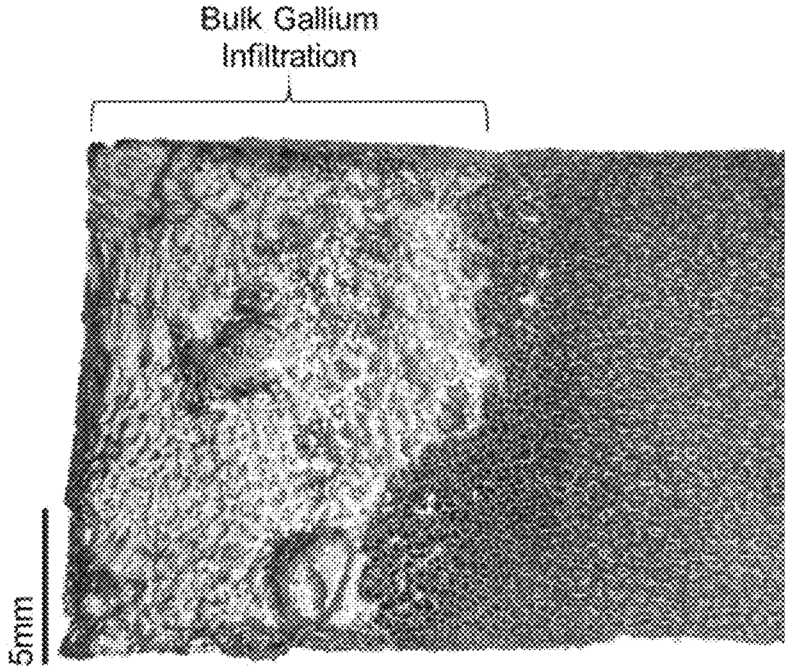
FIG. 4 is a photograph showing the transition area between empty and filled foam.

FIG. 4 is a photograph showing the transition area between empty and filled foam, which occurs where the foam samples were not submerged fully in liquid gallium during the centrifuging process. A low void fraction is clearly visible up to this fill line, indicating relatively consistent material fabrication along the foam strips with no favorable region within the sample region. This supports larger-scale manufacturing.

Figure 5:
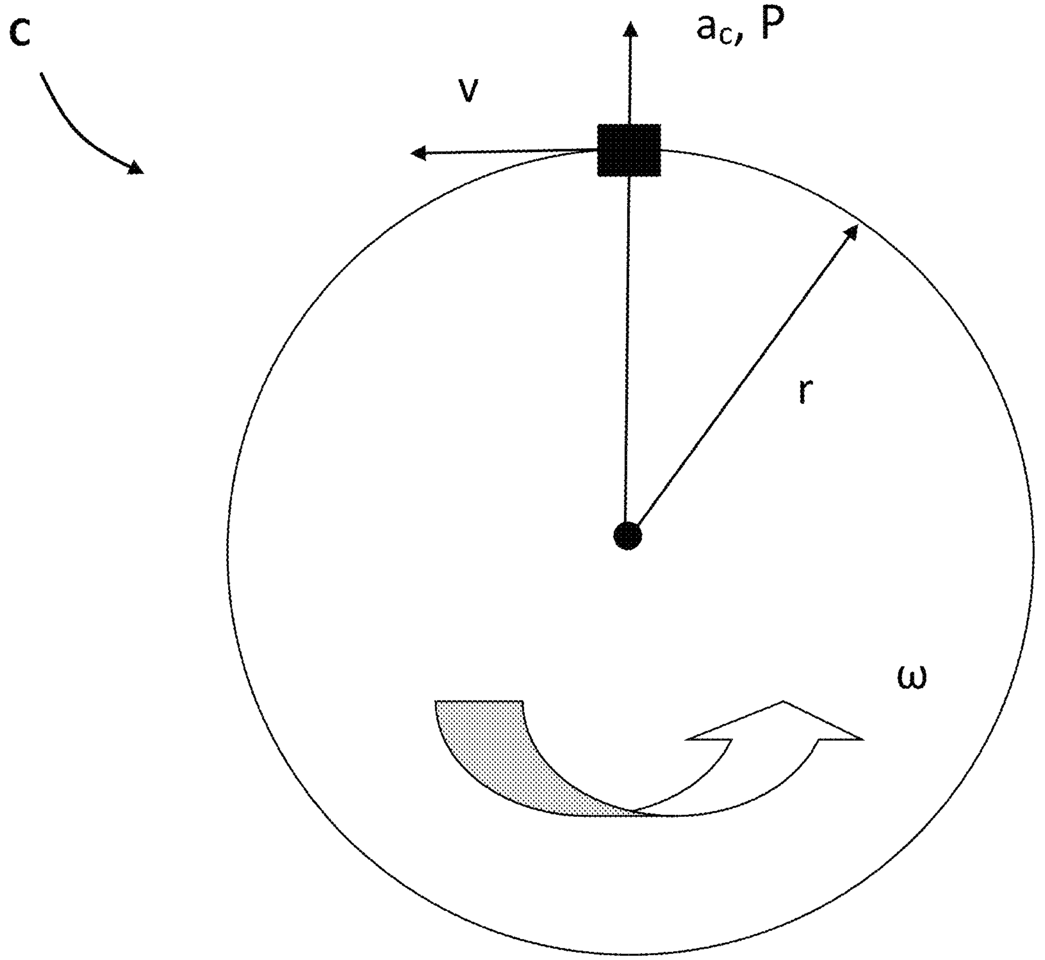
FIG. 5 shows a simplistic schematic of a centrifuge used for gallium infiltration.

FIG. 5 shows a simplistic schematic of a centrifuge C. Centrifugal force Fc calculations are well known based on acceleration $a_c$ according to Newton' Second Law: velocity is tangential; and force/acceleration is radial. The key equations are given by Equations 5 and 6, which relate to mass m and velocity v, ω as follows:

$$\begin{aligned} a_c &= v^2/r \\ &= \omega^2 r \end{aligned} \tag{5}$$

-continued $$= (2\pi n_{rps})^2 r$$
$$= (2\pi n_{rpm}/60)^2 r$$
$$= (\pi n_{rpm}/30)^2 r$$

where $a_c$=centripetal acceleration (m/s$^2$, ft/s$^2$)
v=tangential velocity (m/s, ft/s)
r=circular radius (m, ft)
ω=angular velocity (rad/s)
$n_{rps}$=revolutions per second (rev/s, 1/s)
$n_{rpm}$=revolutions per min (rev/min, 1/min)

We note many laboratory centrifuges, rotors, and tubes report their current and/or maximum angular velocities in RCF—relative centrifugal force, which gives the contained sample's $a_c$ in multiples of g, the standard gravitational acceleration (i.e., 9.81 m/s$^2$).

The hydrostatic pressure P in the gallium liquid outside of the foam composite can be expressed as:

$$P = \rho_{ga} a_c h \quad (6)$$

where $\rho_{ga}$=gallium density (kg/m$^3$, lbf/in$^3$)
h=height of the gallium column in centrifuge tube (m, inches)

We make sure not to load the centrifuge tube with more mass (gallium and foam) than is equivalent to volume of water that fits in the tube's capacity, so as to not exceed the burst rating of the tube or rating of the rotor. Dummy tubes filled with water may be used to balance the rotor as necessary according to the centrifuges operating procedure.

Our novel methodology can be used to create low void fraction gallium composites with any metal that can be made into a porous scaffold, provided there is a gallium-compatible barrier layer such as nickel or platinum. Such foams are useful for any system that undergoes cyclic or intermittent thermal events. This allows the foams to store and release energy, reducing transient temperature spikes. This is relevant to pulsed power, power conversion, and directed energy. Composites 1 (2) (3), thus fabricated according to embodiments of the present invention, may be used for various applications, such as components for electronic devices. One exemplary application is for producing thermal buffering electrical interconnects as disclosed in co-owned U.S. patent application Ser. No. 18/369,934, titled "Thermal Buffering Electrical Interconnects," which was filed on Sep. 19, 2023, herein incorporated by reference in its entirety.

In many near-junction applications, metallic PCMs offer high thermal conductivity, rapidly moving and storing heat away from the junction. Gallium has a desirable melting temperature for semiconductor applications, the high thermal conductivity of a metallic PCM, good energy storage, and high electrical conductivity. Current attempts to integrate a PCM near-junction result in mechanical failure due to the PCMs movement, as well as difficulty in handling the PCM. With the novel, and successful tested, gallium-scaffold infiltration methodology, the gallium-scaffold composite could allow for better near-junction thermal management of transient thermal loads in electronics. The composite scaffold can be cut to specific shapes and easily moved around delicate areas in a package. Due to capillary effects the gallium remains in the scaffold and does not spread within the package causing electrical shorts and failures. The scaffold also enhances heat transfer past the melted gallium closest to the surface by enabling distribution through a larger volume of the gallium.

Supercooling has presented itself as a significant issue in applying PCMs, like gallium, to physical systems. Metallic PCMs have a strong tendency to supercool, requiring a system to achieve a temperature far below the PCM melting point to solidify the gallium and recharge the system, reducing the effectiveness. The integration of gallium with a metallic foam matrix has the potential to reduce supercooling while easing packaging in near-junction applications, as it introduces nucleation sites. Small samples of gallium have been seen to supercool to as low as −184° C., over 200° C. below its melting point, before crystallization occurs. The degree of supercooling has been seen to depend on previous peak temperatures and can be altered with surface area enhancements or nucleating agents. The integration of the porous metal foam was seen to benefit gallium's supercooling. Bulk gallium (~100 mg) was observed to crystalize approximately 50-60° C. below the melting point. The nickel foam sample's crystallization occurred in the range of 40-50° C. below melting and the gold-plated nickel foam samples crystalized in 25-40° C. below melting. Small amounts of gold intermetallic were previously observed to reduce supercooling. The increased surface area interacting with the supercooled liquid gallium also contributes to this observed improvement.

While liquid-solid PCMs have the benefit of molding to their environments, they also present significant obstacles to effective handling. The migration of gallium through a package is especially alarming when gallium's intermetallic formation and high electrical conductivity are considered. Encapsulating gallium in a scaffold reduces its movement, holding thermal capacitance where it is needed most and allowing for simpler packaging.

Aspects of this invention have been previously disclosed by the inventors in the following papers:

Rachel C. McAfee, Michael C. Fish, and Harvey H. Tsang, "Development of Gallium Infiltrated Metal Foams for Transient Thermal Management," *22nd IEEE Intersociety Conference on Thermal and Thermomechanical Phenomena in Electronic Systems* (*ITherm*), Orlando, FL, 30 May 2023-2 Jun. 2023; and Rachel C. McAfee, Michael C. Fish, Adam A. Wilson, Harvey H. Tsang, Jonathan A. Boltersdorf, Soonwook Kim, Nenad Miljkovic, and William P. King, "Fabrication and Thermal Properties of a Gallium and Porous Foam Composite Phase Change Material," *ACS Applied Engineering Materials* Article ASAP (Publication Date: Oct. 27, 2023), https://pubs.acs.org/doi/abs/10.1021/acsaenm.3c00366.

Copies of these papers are herein incorporated by reference in their entireties.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, and to describe the actual partial implementation in the laboratory of the system which was assembled using a combination of existing equipment and equipment that could be readily obtained by the inventors, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

We claim:

1. A method for infiltrating gallium or an alloy thereof into a porous scaffold comprising:
- selecting or providing a porous scaffold;
- forming a coating on the porous scaffold to enhance wetting of the porous scaffold to gallium;
- placing gallium metal or an alloy thereof comprising at least 75 at. % gallium and the coated porous scaffold in a non-oxidizing atmosphere chamber comprising an inert gas;
- heating the gallium metal or an alloy thereof to liquefy it, if needed;
- pulling unoxidized liquid-phase gallium metal or alloy thereof from below an oxide layer on the surface of the liquefied gallium metal or alloy thereof to add to a centrifuge tube;
- placing the coated porous scaffold into the centrifuge tube;
- sealing the centrifuge tube having the coated porous scaffold at least partially submerged in the unoxidized liquefied gallium metal or alloy thereof;
- removing the sealed centrifuge tube from the non-oxidizing atmosphere chamber; and
- using a centrifuge to spin the sealed centrifuge tube to at least partially fill the coated porous scaffold with the unoxidized liquefied gallium metal or an alloy thereof so that the void fraction of the filled porous scaffold is no more than about 2%.

2. The method of claim 1, further comprising: cleaning the porous scaffold before and/or after forming the coating to remove oxides before at least partially filling the coated porous scaffold with the unoxidized liquefied gallium metal or an alloy thereof with the centrifuge.

3. The method of claim 2, wherein the cleaning comprises: applying a HCl, ultrasonic deionized (DI) water, and/or a three-chemical (acetone, methanol, and isopropyl alcohol) rinse to the porous scaffold.

4. The method of claim 1, wherein the coating comprises: gold (Au), copper (Cu), aluminum (Al) or tin (Sn).

5. The method of claim 1, wherein the coating is applied to the scaffold by an electroless metal plating process.

6. The method of claim 1, wherein the thickness of the coating is in the range of 30-100 nm.

7. The method of claim 1, wherein the centrifuge is operated at about 12500 RPM for about 15 minutes.

8. The method of claim 1, wherein the porous scaffold comprises an open pore foam, sponge, woolen material, or 3D printed open pore scaffolding.

9. The method of claim 1, wherein the unfilled porous scaffold has a porosity of about 75-97% or more and an average pore size of approximately 0.01-2.5 mm.

10. The method of claim 1, wherein the unfilled porous scaffold has a surface density of about 350-1500 g/m$^2$.

11. The method of claim 1, wherein the unfilled porous scaffold comprises a metal or alloy, carbon-based material, or ceramic material.

12. The method of claim 11, wherein the metal or metal alloy comprises nickel (Ni), aluminum (Al), platinum (Pt), copper (Cu) or carbon (C).

13. The method of claim 1, wherein the gallium alloy comprises: (i) 5-25 at. % In, and at least 75 at. % Ga; (ii) 10-20 at. % Sn, 15-25 at. % In, and at least 75 at. % Ga; or (iii) 0-1 at %. Zn, 10-20 at. % Sn; 15-25 at. % In, and at least 75 at. % Ga.

14. The method of claim 1, wherein the inert gas in the non-oxidizing atmosphere chamber comprises nitrogen or argon.

15. The method of claim 1, wherein the unoxidized liquified gallium metal or alloy thereof is pulled with a syringe from the center of a container holding the liquefied phase gallium metal or alloy thereof before it is added to the centrifuge tube.

16. The method of claim 1, wherein the gallium metal or alloy thereof and the coated porous scaffold are placed in a vacuum airlock before transferring them to the non-oxidizing environment chamber.

17. The method of claim 16, wherein the airlock is evacuated and then flooded with an inert gas before transferring the gallium metal or alloy thereof and the coated porous scaffold to the non-oxidizing environment chamber.

* * * * *